United States Patent [19]

Beyer et al.

[11] 4,157,328

[45] Jun. 5, 1979

[54] SEALING MATERIAL ON THE BASIS OF POLYTETRAFLUOROETHYLENE FIBERS

[75] Inventors: Gerhard Beyer, Hofheim am Taunus; Gerhard Wölfel, Pfungstadt, both of Fed. Rep. of Germany

[73] Assignee: Hoechst Aktiengesellschaft, Frankfurt am Main, Fed. Rep. of Germany

[21] Appl. No.: 833,711

[22] Filed: Sep. 15, 1977

[30] Foreign Application Priority Data

Sep. 18, 1976 [DE] Fed. Rep. of Germany ....... 2642086
Jul. 20, 1977 [DE] Fed. Rep. of Germany ....... 2732709

[51] Int. Cl.² ............................................. C08K 3/04
[52] U.S. Cl. ........................... 260/42.27; 260/29.1 SB; 260/33.4 F; 260/33.6 F
[58] Field of Search ................ 277/DIG. 6, 165, 102, 277/229, 230; 526/1; 260/29.1 SB, 42.27, 33.4 F, 33.6 F

[56] References Cited

U.S. PATENT DOCUMENTS

| 2,586,357 | 2/1952 | Llewellyn | 260/29.1 SB |
|---|---|---|---|
| 2,593,582 | 4/1952 | Lontz | 260/29.1 SB |
| 2,644,802 | 7/1953 | Lontz | 260/29.1 SB |
| 2,782,180 | 2/1957 | Weidman | 260/42.27 |
| 3,766,130 | 10/1973 | Johnson | 260/42.27 |
| 3,992,350 | 11/1976 | Bensa | 260/42.27 |
| 3,993,584 | 11/1976 | Owen | 260/42.27 |
| 4,042,747 | 8/1977 | Breton | 260/33.6 F |

*Primary Examiner*—Paul R. Michl
*Attorney, Agent, or Firm*—Curtis, Morris & Safford

[57] ABSTRACT

The invention describes a sealing material from polytetrafluoroethylene fibers, whose staple length is in the range of from 1 to 20 mm. They are intimately mixed with graphite; oil and finely divided polytetrafluoroethylene being advantageously added. The portion of PTFE fibers is at least 50% by weight, the portion of graphite is from 10 to 30% by weight, and the portion of finely divided PTFE is from 5 to 15% by weight. As PTFE fibers there are also used those which have been obtained by machining sintered PTFE resin. The sealing material is formed into tablets or half-rings.

The seals prepared are marked by their applicability at uncommonly high pressures.

4 Claims, No Drawings

SEALING MATERIAL ON THE BASIS OF POLYTETRAFLUOROETHYLENE FIBERS

The present invention relates to a sealing material on the basis of polytetrafluoroethylene fibers.

There have been known bearings made of polytetrafluoroethylene (PTFE) in the form of fibers, (Modern Plastics, vol. 37, May 1960, pp. 96 to 100,). However, the known bearings are not suitable for the sealing of pumps and valves since bushes of this kind show in fact good sliding properties, but do not have any sealing effect.

There have also been known packing cords of PTFE which are pressed into packing rings and are then used for the sealing of rotating shafts. These PTFE packings have besides good sliding properties the drawback of a poor thermal conductivity. There is a risk that they become easily hot by friction.

Furthermore, there have been known kneading packings made of graphite which are used for special purposes at particularly high temperatures. They have the drawback that their sealing effect is not optimal. The packings of PTFE fibers+asbestos which have also been known, as well as packings made of asbestos impregnated with PTFE dispersion show a poor thermal conductivity.

Moreover, there have been known packings which consist of PTFE in powder form, graphite and oil. This packing must be installed with chambers and can only be exposed to pressures of up to 50 bars.

Besides, packings have been known in which the fiberless cord consisting of PTFE powder, silicon fluid, graphite and molybdenum sulfide is surrounded with a netting of natural or synthetic fibers. This packing has the drawback that it must be installed with chambers and that additional separators (intermediate rings) must be incorporated in order to avoid a flowing off of the packing core heated by the shaft friction in axial direction.

It has therefore been the objective of the present invention to develop a packing which shows, besides good sliding properties, an especially good sealing capacity, a high resistance to pressure as well as an excellent thermal conductivity at the same time.

This task was solved by developing a sealing material consisting of PTFE short cut fibers which have been intimately mixed with graphite or with graphite +oil or with graphite+finely divided PTFE, or with graphite+finely divided PTFE+oil.

Use was made of graphite having a purity of more than 95%, especially more than 99%.

The sealing material has preferably been pressed into tablets. The PTFE short cut fibers have advantageously a staple length of from 1 to 20 mm, a length between 5 and 15 mm being particularly favorable. Good results are also obtained with lengths between 3 and 7 mm. The PTFE fiber portion is at least 50% by weight, calculated on the finished sealing material; the graphite portion is at least 10% by weight and at most 30% by weight; the portion of the finely divided PTFE is at least 5% by weight and at most 25% by weight.

According to a preferred variant, lubricants have been added to the sealing material, for example, silicone oil, paraffin oil, mineral oils or polyhydric alcohols.

The PTFE fibers have advantageously a titer in the range of from 2 to 50 dtex, preferably from 10 to 30 dtex.

According to another preferred embodiment the sealing material consists of PTFE fibers which are prepared by machining, such as planing, milling, rasping, or turning. The PTFE block (residual block, block waste) used for machining is preferably sintered; it may show a round or angular cross section.

The PTFE fibers produced by machining are intimately mixed with graphite or with graphite+oil or with graphite+finely divided PTFE, or with graphite+finely divided PTFE+oil, or with graphite+PTFE dispersion+oil or with a graphite-PTFE dispersion+oil.

In accordance with the invention the graphite, which is to ensure the thermal conductivity of the sealing material, is present not only on the surface of the sealing material, but is arranged in an intimate mixture both on the surface and within the sealing material. The individual components of the mixture are intimately mixed, for example, in a kneading machine. In the mixing process it is of particular importance that the individual graphite particles are in contact with one another on the fiber. By this measure, an optimum transmission of the frictional heat developing in this process is ensured.

By finely divided PTFE there is to be understood polytetrafluoroethylene having an average size of the individual grain of from 0.1 to 30 μm. It may be present in the form of a powder or as a PTFE dispersion. The finely divided PTFE makes it possible for the sealing tablets to be pressed without difficulty into a homogeneous packing structure, when being pressed through the packing box gland. Besides, the finely divided PTFE increases the sealing capacity and improves the sliding properties.

Use is made of PTFE dispersions having a solids content of polytetrafluoroethylene of from 35 to 60% by weight, preference being given to a PTFE dispersion having a solids content of 60% by weight and an average size of the individual grain in the range of from 0.1 to 0.5 μm.

The admixed graphite should be very pure, the purity being preferably more than 95%, epsecially more than 99%, in order to avoid corrosion marks.

Following the mixing process the packing material is pressed into tablets and half-rings. These forms can be introduced without difficulty into the packing space. By the pressure of the packing box gland the individual tablets and half-rings are compressed to form a homogeneous packing structure.

The oil or oil mixture used serves to impart an improved coherence and improved sliding properties to the sealing material.

It is required to have a boiling point which is above those temperatures which occur in the operation of the packing. Preference is given to oils having a boiling point of more than 200° C.

The PTFE fiber material has a staple length in the range of from 1 to 20 mm. When the fiber length is less than 1 mm, the mixture from the above-mentioned components can only be homogenized with difficulty. With a staple length of the PTFE fibers of more than 20 mm an intimate mixture becomes also difficult. Preference is given to a staple length in the range of from 5 to 15 mm.

A PTFE fiber portion of more than 50% by weight is required to ensure the sealing effect. The graphite portion should not be reduced to less than 10% by weight, so that the graphite particles are in contact with one another throughout the whole packing, which results in an optimum heat transmission. With a graphite portion of more than 30% by weight the sealing effect is reduced. The portion of the finely divided PTFE is at least 5% by weight and at most 25% by weight.

In the following, the effect of a sealing material according to the invention is described in detail.

The following Examples illustrate the present invention.

EXAMPLES

For the four following compositions use was made of PTFE short cut fibers having a titer of 10 dtex/4 mm in length.

1.
80.0% by weight of polytetrafluoroethylene-short cut fiber
20.0% by weight of graphite powder (95% purity)

2.
79.5% by weight of polytetrafluoroethylene-short cut fiber
17.0% by weight of graphite powder (95%)
3.5% by weight of propane-1,2,3-triol 3.
70.0% by weight of polytetrafluoroethylene-short cut fiber
7.0% by weight of finely divided polytetrafluoroethylene
16.0% by weight of graphite powder (99.9%)
3.5% by weight of propane-1,2,3-triol
3.5% by weight of silicone oil 4.
65.0% by weight of polytetrafluoroethylene-short cut fiber
15.0% by weight of finely divided polytetrafluoroethylene
20.0% By weight of graphite (99.0%)

For determining the heat transmission, the temperature in the middle of the packing and in the outer case of the packing box was measured. Besides, the leakage was measured, too. In order to carry out the test, use was made of a centrifugal pump having the following technical data:

Shaft diameter: 32 mm
Pressure: 0.2 to 4.0 bars
Circumferential speed of the shaft: 2.2 to 4.4 m/s
Inner diameter of the packing box: 48 mm
Medium pumped over: pure water.

The pump case and the shaft were made of chromium-plated special steel. The shaft was precisely centered. In order to apply full pressure onto the packing, the rear pressure reducing lamellas has been removed. The packing space of the pump was equipped with the required amount of packing tablets. The packing box gland was tightened by means of a dynamometric key to 15 cm×kp. The pressure of the pumping medium was 3.5 bars. The temperatures in the middle of the packing and at the case of the packing box were continuously measured by means of a thermoelement.

In the following Table, the temperatures and leakages of the packing according to the invention as compared with the conventional types of packing have been shown, which were found after reaching steady operation conditions. The conditions were identical for all tested packings in the pump.

| Type of packing | Temperature of packing in °C. | Temperature of case of pack.box | Leakage ml/h |
|---|---|---|---|
| Commercial PTFE packing cord 0 10 mm with PTFE dispersion + silicone oil | 62 | 45 | 20 |
| Commercial PTFE/ asbestos (50/50%) kneading packing | 70 | 50 | 0 |
| Novel packing in acc. w/invention PTFE + oil + graphite | 28 | 26 | 0 |

For the five following compositions use was made of PTFE fibers which has a length of 8 mm and which had been obtained by machining.

5.
80% by weight of polytetrafluoroethylene fiber
20% by weight of graphite powder (purity 99%)

6.
79.5% by weight of polytetrafluoroethylene fiber
17.0% by weight of graphite powder (purity 99%)
3.5% by weight of propane-1,2,3-triol 7.
70.0% by weight of polytetrafluoroethylene fiber
7.0% by weight of finely divided polytetrafluoroethylene
16.0% by weight of graphite powder (purity 99%)
3.5% by weight of propane-1,2,3-triol
3.5% by weight of silicone oil 8.
65.0% by weight of polytetrafluoroethylene fiber
15.0% by weight of finely divided polytetrafluoroethylene
20.0% by weight of graphite (purity 99%)

9.
50.0% by weight of polytetrafluoroethylene fiber
27.0% by weight of polytetrafluoroethylene dispersion (60% by weight)
16.0% by weight of graphite powder (purity 99%)
7.0% by weight of silicone oil The measurments were carried out as has been described above.

| Type of packing | Temperature in the packing °C. | Temperature of case of pck.box | Leakage ml/h |
|---|---|---|---|
| Commercial PTFE packing cord 0 10 mm with PTFE dispersion +silicone oil | 62 | 45 | 20 |
| Commercial PTFE/ asbestos (50/50%) kneading packing | 70 | 50 | 0 |
| Packing No. 7 of the invention | 32 | 29 | 0 |

We claim:
1. A sealing material from polytetrafluoroethylene which consists essentially of an intimate mixture of at least 50% by weight of polytetrafluoroethylene of cut staple fibers having a length of 1 to 20 millimeters, from 10% to 30% by weight of graphite powder and from 5% to 25% by weight of finely divided polytetrafluoroethylene having an average particle size of 0.1 to 30 microns.

2. Sealing material as claimed in claim 1, wherein the PTFE fibers have been obtained by machining sintered PTFE resin.

3. Sealing material as claimed in claim 1, wherein the graphite used has a purity of more than 95%, especially more than 99%.

4. A sealing material from polytetrafluoroethylene consisting essentially of at least 50% by weight of polytetrafluoroethylene cut fibers having a staple length of 1 to 10 millimeters, a diameter of 0.1 to 3 mm and a titer of 2 to 50 dtex, 10% to 30% by weight of graphite powder, 5% to 25% by weight of finely divided polytetrafluoroethylene having an average particle size of 0.1 to 30 microns and a lubricant selected from silicone oil, paraffin oil, mineral oil and polyhydric alcohols.

* * * * *